(12) United States Patent
Bäcker et al.

(10) Patent No.: US 11,881,350 B2
(45) Date of Patent: Jan. 23, 2024

(54) METHOD FOR PRODUCING A LAMINATED CORE

(71) Applicant: Vacuumschmelze GmbH & Co. KG, Hanau (DE)

(72) Inventors: Frederic Bäcker, Darmstadt (DE); Jens Diehl, Langenselbold (DE); Dominik Fackelmann, Langenselbold (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 208 days.

(21) Appl. No.: 17/165,382

(22) Filed: Feb. 2, 2021

(65) Prior Publication Data
US 2021/0241973 A1 Aug. 5, 2021

(30) Foreign Application Priority Data
Feb. 3, 2020 (DE) .................. 10 2020 102 641.2

(51) Int. Cl.
| | | |
|---|---|---|
| *H01F 41/00* | (2006.01) | |
| *H01F 41/02* | (2006.01) | |
| *H01F 27/25* | (2006.01) | |
| *H02K 1/02* | (2006.01) | |
| *H01F 1/153* | (2006.01) | |
| *H01F 1/147* | (2006.01) | |
| *H01F 27/245* | (2006.01) | |

(52) U.S. Cl.
CPC ..... *H01F 41/0233* (2013.01); *H01F 1/14783* (2013.01); *H01F 1/15316* (2013.01); *H01F 27/245* (2013.01); *H01F 27/25* (2013.01); *H01F 41/0213* (2013.01); *H02K 1/02* (2013.01)

(58) Field of Classification Search
CPC ............ H01F 41/0213; H01F 41/0233; H01F 27/245; H01F 27/25; H01F 1/14783; H01F 1/14791; H01F 1/15316; H01F 3/02; H02K 1/00; H02K 1/02
See application file for complete search history.

(56) References Cited

U.S. PATENT DOCUMENTS

| | | | |
|---|---|---|---|
| 2008/0042505 A1 | 2/2008 | Gerster et al. | |
| 2012/0156441 A1 | 6/2012 | Gerster et al. | |
| 2013/0154434 A1* | 6/2013 | Hasegawa | ............... H02K 1/16 310/216.004 |
| 2015/0018150 A1* | 1/2015 | Cowen | ................... F16H 57/05 474/152 |
| 2017/0306704 A1* | 10/2017 | Wong | ..................... E21B 17/00 |

(Continued)

FOREIGN PATENT DOCUMENTS

| | | |
|---|---|---|
| DE | 102008047761 A1 | 4/2010 |
| DE | 102009049750 A1 | 4/2011 |
| DE | 102017009132 A1 | 3/2018 |

(Continued)

*Primary Examiner* — Paul D Kim
(74) *Attorney, Agent, or Firm* — Dickinson Wright PLLC (57) ABSTRACT

A laminated core comprising a plurality of lamination sheets made of a soft magnetic alloy is provided. The lamination sheets have a main surface and a thickness d. The main surfaces of the lamination sheets are stacked one on top of another in a direction of stacking. Adjacent lamination sheets are joined to one another by a plurality of substance-to-substance joints, the joints being filler-free and entirely surrounded by the main surfaces of the adjacent lamination sheets.

9 Claims, 6 Drawing Sheets

(56) References Cited

U.S. PATENT DOCUMENTS

2020/0067388 A1    2/2020  Zeadan et al.
2021/0328484 A1*  10/2021  Bäcker .................... H02K 1/02

FOREIGN PATENT DOCUMENTS

| DE | 102016222385 A1 | 5/2018 |
| DE | 102018006773 A1 | 3/2019 |
| DE | 102017130883 A1 | 6/2019 |
| EP | 1614499 A1 | 1/2006 |
| EP | 2629922 B1 | 3/2015 |

* cited by examiner

METHOD FOR PRODUCING A LAMINATED CORE

This U.S. patent application claims priority to German patent application 10 2020 102 641.2, filed on Feb. 3, 2020, the entire contents of which are incorporated herein by reference for all purposes.

BACKGROUND

Technical Field

The invention relates to a laminated core, an electric machine, a transformer and a method for producing a laminated core.

Related Art

In electromagnetic machines that can be operated as electric motors or generators power density and efficiency are substantially determined by the stator and rotor components of the motor. They conduct and concentrate the magnetic flow generated by the windings and permanent magnets and enable it to be converted into mechanical work.

When a motor is running the direction and strength of the magnetic flow in the rotor and the stator are subject to periodic change. This alternating magnetic field induces in the perpendicular direction, i.e. in the direction of the longitudinal axis of the rotor and the stator, eddy currents that dissipate part of the energy supplied to the system as heat such that it ceases to contribute to the mechanical work done. In order to minimise eddy currents and the associated losses it is desirable for the electrical resistance of the rotor and the stator perpendicular to the magnetic flow to be higher. This is typically achieved by a layered structure in which the rotor and the stator have a plurality of identical individual sheets referred to as "laminations" or "layers" that are stacked one on top of another and electrically insulated from one another. A structure of this type is referred to as a "laminated core". In such an arrangement eddy current losses are proportional to the square of the sheet thickness of the individual layers such that the thinner the layers, the lower the eddy current losses and the higher the efficiency.

A further characteristic of laminated cores is the fill factor. This term describes the amount of magnetically conductive material within a laminated core and is obtained by subtracting the volume of insulating layers, adhesive layers, air gaps and other non-magnetically conductive layers from the total volume. Amongst other factors, the fill factor determines the power density that can be achieved with a given drive.

Stator and rotor laminated cores can be produced using various manufacturing methods based on various lamination joining and shaping processes. Some of these can be integrated cost-effectively in mass production processes such as punching; others are more suitable for sample and batch production. There are, however, also undesirable restrictions relating either to the sheet thickness or material that can be processed or to the quality that can be achieved in terms of fill factor, geometric tolerances and the avoidance of damage to the soft magnetic material due to the production method.

SUMMARY

The object is therefore to provide a laminated core that is effective in terms of both performance and cost and to provide a method for producing a laminated core that is flexible.

According to the invention, a laminated core is provided that comprises a plurality of lamination sheets made of a soft magnetic alloy. The lamination sheets have a main surface and a thickness d. The main surfaces of the lamination sheets are stacked one on top of another in a direction of stacking. Adjacent lamination sheets are joined together by a plurality of substance-to-substance joints, the joints being filler-free and entirely surrounded by the main surfaces of the adjacent lamination sheets.

The joints are laterally entirely surrounded by the main surfaces of the lamination sheets in which they are arranged and are thus arranged not at the edges of the lamination sheets but within the main surfaces of the lamination sheets, and are separated from the edges by the material of the lamination sheets. These joints may, for example, be formed of resolidified molten material of the lamination sheets and be formed by a process such as welding, e.g. spot welding or laser spot welding. As the lamination sheets are stacked one on top of another a lap welding process is used.

The laminated core according to the invention is distinguishable by the fact that instead of a few comparatively large joints it has a plurality of smaller, spatially favourably distributed joints that can be optimised in number, size, form and position so as to have a minimal adverse effect on the electromagnetic properties and the desired joint strength of the individual layers. This allows the desired performance characteristics of the laminated core including lower eddy current losses, greater efficiency and a high fill factor, to be achieved. The laminated core can be manufactured with different dimensions, i.e. different contours and different numbers of stacked lamination sheets, and from different materials, thereby ensuring that the production process is also flexible.

The present invention provides a laminated core and a method for producing a laminated core that are particularly suitable for the production of a medium-sized and large series of laminated cores for high-performance and high-efficiency stators and rotors and for the production laminated cores from very thin layers of sheet. It is based on a joining method, e.g. laser spot welding using a lapping technique, with which a plurality of small joints can be produced and so provides another type of core. This core type meets requirements for efficient high-performance drives, while the manufacturing method permits the structure on which it is based and offers a high degree of automation and thus high productivity levels.

In one embodiment the joining of individual sheet layers is used to produce laminated cores for stators and rotors by means of laser spot welding using a lap welding technique. Two or more sheet layers to be joined together are stacked one on top of another and tensioned together (pressed against one another) in order to achieve a surface-to-surface contact with the minimum possible air gap. The sheet material is fused by a laser beam from the exposed main surface of the top-most lamination sheet in the stack to a defined depth and thus over a defined number of layers. The solidification of the molten material produces a substance-to-substance joint between the layers. The depth of the joint produced and so the number of layers joined by this joint can be varied by adjusting the laser beam parameters (power, focal position, pulse duration, etc.). The joint can be positioned anywhere on the main surface of the laminations. These steps are repeated, stacking further lamination sheets on the stack and then joining the stack to the stacks below it by a plurality of joints in order to produce the desired height.

The laminated core has good properties for the manufacture of rotors and stators in medium-sized and mass production series. It offers a better compromise between production process productivity, core properties achieved in terms of expected eddy current losses and joint strength between individual layers. The manufacturing method and the core type it produces result in the following advantages:

In particular, the laminated core can have very thin laminations with thickness of less than 0.2 mm, e.g. 0.1 mm or less, resulting in lower eddy current losses and higher output.

The manufacturing method is suitable for stacking very thin layers with a sheet thickness of less than 0.2 mm, e.g. with a sheet thickness of 0.1 mm or less, at very good levels of automation and so good productivity. This improves the resistance against eddy currents product property of the laminated core in comparison to laminated cores manufactured using production processes with similar or better productivity, such as in-die stacking, bonding or the welding of an entire stack with an edge seam that can only be used with thicker sheet layers. Conversely, the levels of productivity achieved for comparably thin or thinner layers using conventional stacking techniques are not comparable with those of the method disclosed here. The method according to the invention therefore permits the mass production of stacks that meet the highest requirements.

In some embodiments the joints are laterally completely bordered by the crystalline material of the lamination sheets, while the joints themselves have a structure that is different to the rest of the lamination sheet. For example, the joints may have a smaller grain size than or a different texture to the crystalline material of the adjacent lamination sheet. This excludes the lateral adjacence of part of the joint, in particular the side wall, to the air, as is the case with a joint on the end face of the laminated core that extends over the thickness of the lamination sheet, for example.

In some embodiments the joints are formed of molten material of the soft magnetic alloy. The molten material may have the same overall composition as the soft magnetic alloy of the surrounding lamination sheets but different phases, or may have the same composition and the same phases, as the case may be.

In some embodiments the joints of the laminated core take the form of weld seams. The weld seams may have different lateral forms, e.g. they may be punctiform or elongated or follow any predetermined path.

In some embodiments the joints are distributed over the main surface of the lamination sheets and may be distributed over the central region of the main surface of the lamination sheets. The joints may be evenly distributed over the main surface or the central region of the main surface in order to increase mechanical stability, for example, or may be unevenly distributed over the main surface or the central region of the main surface in order to improve the magnetic properties of the laminated core in operation, for example.

In some embodiments the joints are distributed throughout the volume of the laminated core. The joints may be arranged in a plurality of planes of the laminated core. The joints may have a different lateral arrangement in the planes such that joints in adjacent planes are laterally offset, or may be arranged one on top of another in the direction of stacking in order to form a column.

The joints may have different lateral forms. The joints of a laminated core may have the same or different lateral forms. For example, the joints in the plane of the main surface of the lamination sheets may be punctiform, circular, elongated, corner-shaped, annular, curved or straight or be X-shaped, Y-shaped, V-shaped or U-shaped. The joints may have different forms within a plane and/or in different planes.

In some embodiments at least one of the joints has at least one dimension A, where 10 µm≤A≤1000 µm, preferably 10 µm≤A≤500 µm, preferably 20 µm≤A≤100 µm.

In some embodiments at least one of the joints is punctiform and has a diameter D, where D=A.

In some embodiments at least one of the joints is elongated and has a width B and a length L, where B=A and L>B.

The lamination sheets may have different thicknesses d, where d≤0.5 mm, preferably d≤0.35 mm, d≤0.20 mm or d≤0.10 mm. The minimum thickness of the lamination may be determined by manageability. For example, the minimum thickness may be 0.02 mm.

The joints have a depth t and the depth t of at least one of the joints may extend over a maximum of two or a maximum of three or at least two or at least three adjacent stacked lamination sheets in order to join the two or at least three adjacent stacked lamination sheets together substance-to-substance. In one embodiment t<2d such that the joint is arranged in two adjacent lamination sheets but not over the entire thickness of either one of these lamination sheets. As a result, the lower main surface of the lower lamination sheet has no joint.

The depth of the individual joints may be restricted by arranging the joint in only two or only three adjacent stacked lamination sheets. The depth of the joint may, for example, be restricted by the choice of the power and pulsation duration of the laser beam. The individual joints in a laminated core may have different depths.

In one embodiment t>2d such that the joint is also arranged in the main surface of the bottom-most lamination sheet and is arranged in three adjacent lamination sheets.

In some embodiments the joint extends in the bottom-most lamination sheet of the laminated core over only part of the total thickness of the sheet such that the lower end face of the laminated core is free of joints. The joints can therefore have a molten region in the bottom-most lamination sheet of the laminated core that extends over only part of the total thickness of the lamination sheet such that the lower end face of the laminated core is free of joints.

In some embodiments the joints together form a total electrical contact surface between two adjacent joined lamination sheets of less than 10%, preferably less than 5% or less than 1% of the boundary surface between the lamination sheets to ensure that the individual lamination sheets are sufficiently electrically insulated from one another. The individual lamination sheets may be coated with an insulating layer. This insulating layer may be applied before the joints are produced if the layer is thin because a joint can be formed through the insulating layer.

The lamination sheets may be separated from a strip. The lamination sheets may have a direction that is parallel to a given direction of the strip. This given direction of the strip may, for example, be the direction of rolling of the strip, the longitudinal direction of the strip conventionally being lengthwise to the direction of rolling of the strip. The lamination sheets are stacked one on top of another in the direction of stacking such that the direction of the lamination sheets varies. In some embodiments the directions of the lamination sheets are arranged randomly. In some embodiments adjacent lamination sheets are rotated in relation to one another by a given angle, e.g. 90°, 45° or 30°. These arrangements of the lamination sheets can be used to compensate for direction-dependent lamination sheet or strip parameters. For example, magnetic properties might be different in the direction of rolling and the transverse direction.

In some embodiments the lamination sheets have a thickness that varies over the area of the lamination sheet and/or the lamination sheets themselves have different thicknesses. For example, the thickness of a lamination sheet in the central region may be greater than in the edge region. The thickness of the lamination sheet of a laminated core may also be different if the thickness of the strip from which it has been separated varies over the length or the width of the strip or if the lamination sheets have been separated from strips of different thickness. It is possible to compensate for direction-dependent variations in the thickness of the lamination sheets by choosing a suitable stacking method in which the lamination sheets are arranged in different directions around the direction of stacking.

Various soft magnetic alloys can be used for the lamination sheets. For example, the soft magnetic alloy may have one of the following compositions:

an FeSi-based alloy with 2 to 4.5 wt % (weight percent) of at least one element from the group comprising Si and Al, the rest Fe and unavoidable impurities, or a CoFe-based alloy comprising 35 to 55 wt % Co and up to 2.5 wt % V, the rest Fe and unavoidable impurities, or a CoFe-based alloy comprising 45 wt %$\leq$Co$\leq$52% wt %, 45 wt %$\leq$Fe$\leq$52% wt %, 0.5 wt %$\leq$V$\leq$2.5% wt %, the rest Fe and unavoidable impurities, or a CoFe-based alloy comprising 35 wt %$\leq$Co$\leq$55% wt %, preferably 45 wt %$\leq$Co$\leq$52% wt %, 0 wt %$\leq$Ni$\leq$0.5% wt %, 0.5 wt %$\leq$V$\leq$2.5% wt %, the rest Fe and unavoidable impurities, or a CoFe-based alloy comprising 35 wt %$\leq$Co$\leq$55% wt %, 0 wt %$\leq$V$\leq$2.5% wt %, 0 wt %$\leq$(Ta+2Nb)$\leq$1% wt %, 0 wt %$\leq$Zr$\leq$1.5% wt %, 0 wt %$\leq$Ni$\leq$5% wt %, 0 wt %$\leq$C$\leq$0.5% wt %, 0 wt %$\leq$Cr$\leq$1% wt %, 0 wt %$\leq$Mn$\leq$1% wt %, 0 wt %$\leq$Si$\leq$1% wt %, 0 wt %$\leq$Al$\leq$1% wt %, 0 wt %$\leq$B$\leq$0.01% wt %, the rest Fe and unavoidable impurities, or a CoFe-based alloy comprising 5 to 25 wt % Co, 0.3 to 5.0 wt % V, the rest Fe and unavoidable impurities, or a CoFe-based alloy consisting essentially of:
5% wt %$\leq$Co$\leq$25% wt %
0.3% wt %$\leq$V$\leq$5.0% wt %
0% wt %$\leq$Cr$\leq$3.0% wt %
0% wt %$\leq$Si$\leq$3.0% wt %
0% wt %$\leq$Mn$\leq$3.0% wt %
0% wt %$\leq$Al$\leq$3.0% wt %
0% wt %$\leq$Ta$\leq$0.5% wt %
0% wt %$\leq$Ni$\leq$0.5% wt %
0% wt %$\leq$Mo$\leq$0.5% wt %
0% wt %$\leq$Cu$\leq$0.2% wt %
0% wt %$\leq$Nb$\leq$0.25% wt %
0% wt %$\leq$Ti$\leq$0.05% wt %
0% wt %$\leq$Ce$\leq$0.05% wt %
0% wt %$\leq$Ca$\leq$0.05% wt %
0% wt %$\leq$Mg$\leq$0.05% wt %
0% wt %$\leq$C$\leq$0.02% wt %
0% wt %$\leq$Zr$\leq$0.1% wt %
0% wt %$\leq$O$\leq$0.025% wt %
0% wt %$\leq$S$\leq$0.015% wt %
the rest iron, where Cr+Si+Al+Mn$\leq$3.0% wt %, and up to 0.2 wt % of other impurities, where in further embodiments
10 wt %$\leq$Co$\leq$20% wt %, preferably 15 wt %$\leq$Co$\leq$20% wt %, or 0.5 wt %$\leq$V$\leq$4.0% wt %, preferably 1.0 wt %$\leq$V$\leq$3.0% wt %, preferably 1.3 wt %$\leq$V$\leq$2.7% wt %, or 0.1 wt %$\leq$Cr$\leq$2.0% wt %, preferably 0.2 wt %$\leq$Cr$\leq$1.0% wt %, preferably 0.3 wt %$\leq$Cr$\leq$0.7% wt %, or 0.1 wt %$\leq$Si$\leq$2.0% wt %, preferably 0.15 wt %$\leq$Si$\leq$1.0% wt %, preferably 0.2 wt %$\leq$Si$\leq$0.5 wt % and/or the sum formula being 0.1 wt %$\leq$Cr+Si+Al+Mn$\leq$1.5% wt %, preferably 0.2 wt %$\leq$Cr+Si+Al+Mn$\leq$0.6% wt %.

An electric machine having a rotor and a stator or having a carriage and a stator is also provided, the stator having a laminated core according to any one of the preceding embodiments.

The electric machine can be used as a motor and/or as a generator.

The use of the electric machine according to any one of the preceding embodiments as a drive for an electric or hybrid-electric aircraft, as a main or auxiliary drive for a motor vehicle or as a generator for the generation of electricity for an aircraft is also provided.

A transformer having a laminated core according to any one of the preceding embodiments is also provided.

The invention also provides a method for producing a laminated core in which a plurality of lamination sheets made of a soft magnetic alloy is provided, the lamination sheets each having a main surface and a thickness d. The main surface of a first of the lamination sheets is stacked on the main surface of a second of the lamination sheets in a direction of stacking. The first and the second lamination sheets are joined substance-to-substance by means of a plurality of filler-free joints, the filler-free joints being entirely surrounded by the main surfaces of the first and the second lamination sheets.

The first lamination sheet may be substance-to-substance joined to the second lamination sheet by means of laser welding or laser spot welding in order to form a joint.

In some embodiments a laser beam is directed laterally to position the joint on the first lamination sheet. A focal point of the laser beam can be directed vertically to determine the vertical course of the joint.

In some embodiments the laser beam is directed at the main surface of the first lamination sheet so as to form a punctiform joint.

In some embodiments the laser beam is directed over the main surface of the first lamination sheet so as to form an elongated joint with a longitudinal direction. The elongated joint may, for example, be a straight line, a curve or be X-shaped, U-shaped, V-shaped or zig-zag-shaped.

The longitudinal direction may be arranged parallel to the lines of the magnetic flow in the finished laminated core in order to reduce eddy currents and the associated losses. In some embodiments the longitudinal direction is arranged parallel to the lines of the magnetic flow in this plane of the finished laminated core.

In some embodiments the first lamination sheet and the second lamination sheet are separated from a strip of the soft magnetic alloy. For example, the first lamination sheet and the second lamination sheet are separated from a strip by means of punching, shear cutting, laser fusion cutting, laser sublimation cutting, rotational cutting, electrical discharge machining or etching.

In some embodiments the lamination sheets are separated from a strip and have a direction that is parallel to the direction of rolling of the strip. The lamination sheets are stacked such that the direction of the lamination sheets varies about the direction of stacking. This arrangement can have the advantage of making it possible to compensate for differences between the lamination sheets, e.g. a variation in thickness and/or direction-dependent magnetic properties in the laminated core, such that the laminated core has more spatially homogeneous properties.

In some embodiments the first lamination sheet and the second lamination sheet are aligned in relation to one another to form a lap joint or a parallel joint. In this way the joints can be produced between the first and second lamination sheets by positioning the joint or the laser beam on the main surface of the top-most lamination sheet.

In some embodiments the first lamination sheet and the second lamination sheet are tensioned to reduce the air gap between the first lamination sheet and the second lamination sheet. In this way it is possible to increase the fill factor of the laminated core.

In some embodiments at least three lamination sheets are stacked one on top of another and joined together by means of a plurality of joints. Using this method it is possible to reduce the number of joining steps and to increase productivity.

In some embodiments the method according to any one of the preceding embodiments also includes the stacking of at least one further lamination sheet on the second lamination sheet, followed by the substance-to-substance joining of the further lamination sheet and the first lamination sheet by means of a plurality of filler-free joints that are entirely surrounded by the main surface of the further and the first lamination sheets.

BRIEF DESCRIPTION OF THE DRAWINGS

Embodiments und examples are described in greater detail below with reference to the drawings.

DETAILED DESCRIPTION

Figure 1A:
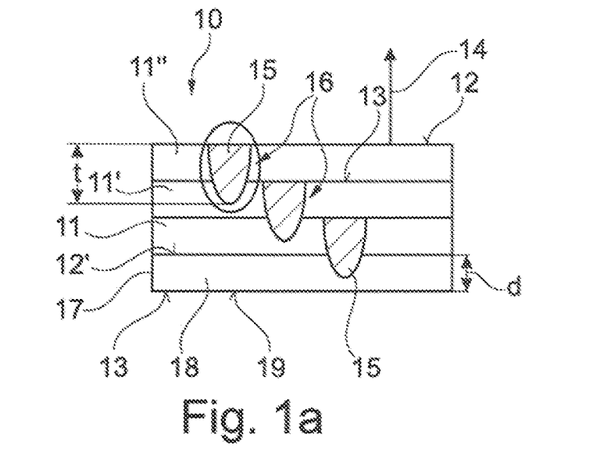
FIG. 1a shows a schematic illustration of a cross section of a laminated core with joints according to a first embodiment.

FIG. 1a shows a schematic representation of a cross section of a laminated core 10. The laminated core 10 has a plurality of lamination sheets 11 made of a soft magnetic alloy. The soft magnetic alloy may, for example, be a CoFe-alloy, e.g. 49 wt % Fe, 49 wt % Co und 2 wt % V+Nb.

The lamination sheets 11 each have a main surface 12, an opposing main surface 13 and a thickness d. The thickness d may be approximately 0.1 mm. The lamination sheets 11 are stacked one on top of another in a direction of stacking 14, this direction of stacking 14 extending perpendicular to the main surfaces 12, 13 of the lamination sheets 11. Adjacent lamination sheets, e.g. lamination sheets 11' and 11" in FIG. 1a, are joined to one another by at least one at least, preferably a plurality of, substance-to-substance joints 15. The joints 15 are filler-free and are each entirely surrounded by the main surface 12 of the lamination sheets 11', 11". The plurality of substance-to-substance joints 15 are distributed over the main surface 12 of the lamination sheets 11. The joints 15 may be made by laser welding, for example, such that the joints 15 are formed of molten material of the soft magnetic alloy that has resolidified.

The laminated core 10 may comprise numerous stacked lamination sheets 11, e.g. 100 to 500. The joints 15 have a depth t such that they are arranged in two, as illustrated in the first embodiment shown in FIG. 1a, or more than two, e.g. three as illustrated in the second embodiment shown in FIG. 1b, lamination sheets 11, and these lamination sheets are joined to one another at certain points. In cross section, the laminated core 10 has a plurality of joints 15 that are arranged in different planes 16 of the laminated core 10 such that the lamination sheets 11 are built up by the joints 15 to form a laminated core. As a result, the joints 15 are distributed throughout the volume of the laminated core 10.

Figure 1B:
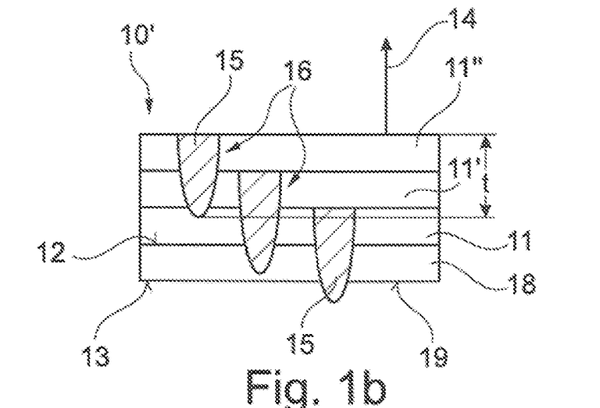
FIG. 1b shows a schematic illustration of a cross section of a laminated core with joints according to a first embodiment.

Outside of the joints 15, adjacent lamination sheets 11 may be separated from one another and/or electrically insulated from one another. The lamination sheets 11 may have an insulating layer that covers at least the main surfaces 12, 13. This insulating layer may, for example, be made of MgO or $ZrO_2$. The lamination sheets 11 may be coated with the insulating layer individually. In some embodiments, however, the strip is coated with the insulating layer and the lamination sheets 11 are then separated from the strip with the insulating layer on the opposing main surfaces 12, 13. It is possible to coat only one of the main surfaces with the insulating layer and to arrange the insulating layer between adjacent lamination sheets 11 in the stack. In some embodiments the insulating layer is applied to both main surfaces 12, 13 using a dipping process, for example.

In the first embodiment illustrated in FIG. 1a the depth t of the joint is less than 2d, i.e. twice the thickness. As a result, the joint 15 does not extend as far as the lower main surface 13 of the lower lamination sheet 11. This arrangement may be used for all or only some of the joints 15, for example for the bottom-most joints, such that the underside 19 of the laminated core 10 formed by the lower main surface 13 of the bottom-most lamination sheet 18 has no joints and so has a continuous uninterrupted structure.

In the second embodiment illustrated in FIG. 1b the depth t of the joint is greater than 2d such that the joint 15 is arranged in three adjacent lamination sheets 11, 11' and 11". In this embodiment the bottom-most joint 15 extends as far as the underside 19 of the laminated core 10.

In some embodiments, as in the first and second embodiments shown in FIGS. 1a and 1b, the joints 15 are offset laterally in relation to one another in two adjacent planes 16 of the laminated core 10. It is, however, also possible for a plurality of joints 15 to be arranged vertically one on top of another. Depending on the depth of the joints, the vertically aligned joints may overlap vertically or abut one another vertically so as to form a column of re-solidified molten material of the soft magnetic alloy.

The laminated cores 10, 10' have joints 15 which, rather than extending along the outer or inner contour of the stack 10, 10', are arranged on the main surfaces 12, 13 of the individual laminations 11 and between the individual layers of the stack 10, 10'. In contrast to laminated cores in which a plurality of stacked lamination sheets 11 are joined to one another by a weld seam at one end face 17 of the laminated core 10, here the joints 15 are entirely laterally surrounded by the adjacent lamination sheets 11 in which the joint 15 is arranged such that the joint 15 is entirely and uninterruptedly surrounded laterally by the crystalline, amorphous or nanocrystalline material of the lamination sheets 11. With the joints 15 in the laminated core 10, 10' according to the invention, however, at least the side walls of the joints 15 entirely and uninterruptedly abut the material of the lamination sheets 11. In contrast, when there is a seam on the end face 17 of the laminated core 10 at least part of the seam abuts the air.

Figure 1C:
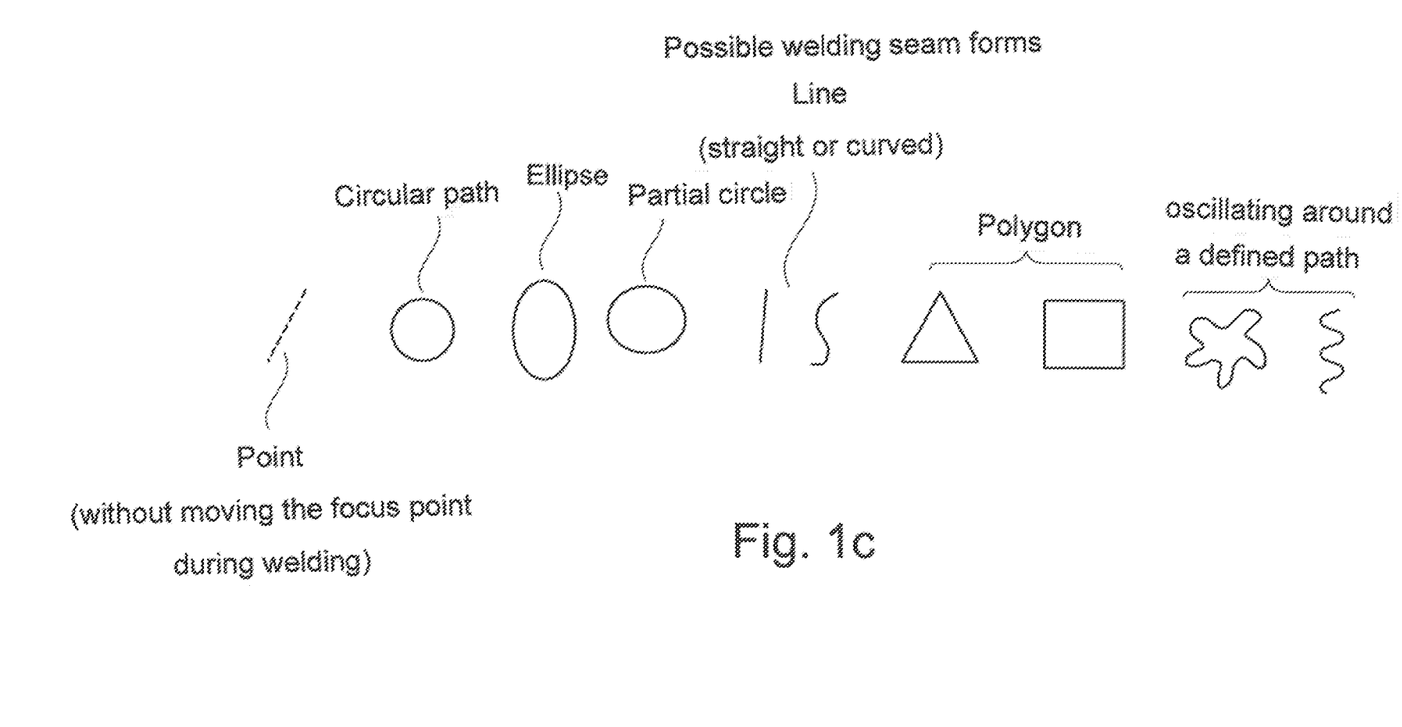
FIG. 1c shows a schematic illustration of various lateral forms of joints for a laminated core.

In the top view the joints 15 can have different lateral forms. It is also possible to use joints of different lateral form and/or different depth in the same laminated core. FIG. 1c shows a schematic representation of different lateral forms that can be used for the joints 15. For example, the joints may be a circle, an ellipse, part of a circle, a straight or curved line, a polygon or oscillate about a given path in the form of a ring or a straight line.

Figure 2:
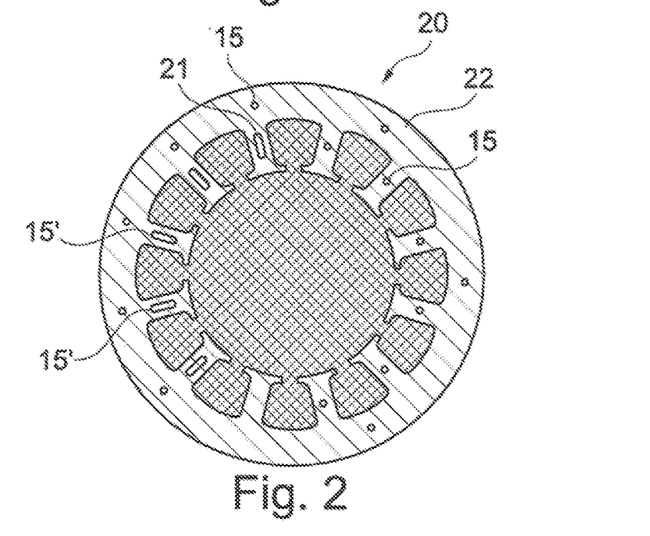
FIG. 2 shows a top view of the end face of a laminated core indicating joints.

FIG. 2 shows a top view of the end face of a laminated core 10 that has the form of a stators 20. The stator 20 has a plurality of teeth 21 that are evenly distributed around an outer ring 22 such that the teeth 21 point towards the centre point or centre axis 23 of the stator 20. FIG. 2 shows examples of joints 15 in schematic form. The joints 15 may be punctiform and be arranged both in the central region of the ring 22 and in the central region of the teeth 21. In other embodiments the joints 15' have an elongated form such as a line, which can be straight as illustrated in FIG. 2, for example. An elongated joint 15 may also have other forms, e.g. a curved shape or the shape of a circular ring, or be X-shaped, V-shaped, etc. Other joints 15 not shown in the top view are arranged between lamination sheets located in the stack of the laminated core 10 such that the joint 15 is arranged in a plurality of planes and is distributed throughout the volume of the laminated core 10 in order to join all the lamination sheets substance-to-substance joint at certain points to form a laminated core 10.

The joints 15 are laterally small and distributed over the main surfaces 12, 13 such that they can be produced with a low-energy laser beam, thereby reducing the risk of damaging the lamination sheet 11 by erroneously making a hole in the lamination sheet, for example. Consequently, the sheet thickness of the individual layers of the laminated cores 10 can be very low, typically in the region of 0.1 mm or even lower.

As a result of the laser welding process the laminated cores may have very small joints. In the case of spot welding, weld spot diameters in the region of 10 µm to 1000 µm, 10 µm to 500 µm or 20 µm to 60 µm can be achieved. In the case of linear seams, the joints may have seams of the same width, i.e. a width of 10 µm to 1000 µm, 10 µm to 500 µm or 20 µm to 60 µm, and a length L, where L>B. The electrical contact surface between the layers can be reduced to a maximum of 10% or 5% or 1% of the boundary surface, for example. This increases the electrical resistance between the individual layers and so reduces eddy current losses.

The laminated cores 10, 10' may also have joints 15 between the lamination sheets 11 that can vary in form, size, number and position on the cross section from lamination sheet to lamination sheet. Moreover, the form, size, number and position of the lamination sheets 11 can be adapted to the locally occurring magnetic flow density within the layers during operation of the laminated core 10. The joints 15 can be designed so as to reduce any negative influences on the magnetic properties of the layers.

The laminated core according to the invention can be produced by means of various methods.

In one embodiment individual laminations are completely separated from a sheet, stacked manually layer by layer one on top of the other and joined to the stack by means of a plurality of welded points distributed over the main surface.

In one embodiment each layer is aligned using an appropriate device and clamped to the existing stack before laser spot welding is carried out.

The purpose of this alignment is to ensure the complete overlapping of the layers with no lateral offset and no undesirable relative rotation about the longitudinal axis of the stack. Mechanical stops and template elements that engage in a form fit with geometrical elements of the individual layers, for example, can be used to perform this alignment. External and internal diameters, tooth flanks and locating elements fitted by the stack manufacturer, for example, are suitable for positioning the finished stacks on the motor/generator shaft or in a house.

The purpose of tensioning the layers is to ensure a minimum air gap between them after welding. This tensioning can be carried out using a guide, for example, that presses an individual lamination flat against the top-most lamination of the already joined stack and contains local openings to permit welding. Here either the guide may be pressed against the stack or the stack pressed against the guide. The option of a fixed guide offers the advantage of providing a fixed focal point location for the laser welding operation.

For the laser welding a solid-state fibre laser, for example, may be used. With this method a scanner objective permits the rapid and accurate positioning of the focal point in the work chamber of the laser system by directing the laser beam by means of mirrors, thereby making it possible to produce all the joints on one layer in one tensioning operation. Furthermore, the programmable objective can, where necessary, be used to adapt the focal position to a given stack height. Depending on the design of the joint, continuous-wave or pulsed-wave laser welding can be used. A scanner objective with a plane field lens, for example, can be used to position the laser beam perpendicularly on the surface, while the laser beam is guided over the surface to position the joint exactly.

This manual embodiment of the method is particularly suitable for the production of samples and prototypes in small quantities.

In a second embodiment individual method steps such as the stacking, positioning and tensioning of the laminations are automated such that the entire method is partially automated. To this end, ready cut laminations are fed in a magazine or connected by microwebs in a metal strip, for example, to the automatic system, which then transfers them by means of a grabber/suction cup, slider or turntable for welding in the work chamber of the laser system, where they are automatically tensioned and joined substance-to-substance at a plurality of points to the lamination sheet or sheets below. Once the desired stack height is reached, the partially automated process comes to an end and the finished stack can be removed. The stack height can be determined by an integrated height measurement device or by a layer-counting function in the automated system.

In a third embodiment the method if further automated. In the third embodiment a sheet metal band or a series of metal plates (both referred to below as "strips") are fed to a system. This can be done by means of a decoiler, guide rollers or a feeder device, as used in punching technology. With small sheet thicknesses there is no need for straightening to remove any coil set that may be present. The contour of a first lamination is cut from the strip using an integrated cutting tool. Once cut out, the lamination remains substance-to-substance joined to the strip either along the entire outer contour or by microwebs.

The cutting of the lamination contour can be divided between a plurality of stations and carried out separately in one or more feed cycles. At the first stations the parts of the cut that produce loose scrap are carried out. This scrap falls from the strip under the effect of gravity and in some cases assisted by being blown out using compressed air, for example, and is removed from the system by means of scrap chutes, for example. A feed cycle places the first lamination in a positioning device. Here the microwebs are either severed perpendicular to the infeed by remote laser cutting or by a further tool movement and the lamination thus removed from the strip. The next feed cycle positions a second lamination above the first in the same manner.

In a manner similar to the second partially automated embodiment, the two laminations are now automatically tensioned together by a guide and then joined by repeated laser welding. In a further feed cycle the scrap remaining in the strip (the "scrap lattice") is transported out of the work chamber and the next lamination is positioned above the stack already joined. The stack grows layer by layer as the process is repeated, the already joined laminations being removed as a growing stack in a second cycle direction perpendicular to the strip. The second cycle direction may, for example, take the form of a vertical movement of the lamination positioning device. Alternatively, the focal position can be adjusted by moving the laser vertically.

If the individual operations are separated as in this third embodiment, pilot holes can be cut at the first station and then used at subsequent stations pin stops to position the strip (ventilated infeed). This ensures the exact positioning in relation to one another of the cutting and welding operations carried out at the individual stations.

In all the preferred embodiments described below the term "joint" is always used to refer to a joint produced by laser welding in the form of a lap joint according to the third embodiment.

In a third embodiment of a laminated core the laminated core has a plurality of punctiform joints with a diameter of not more than 20-200 μm that are distributed over the contact surface of at least two layers to be joined, i.e. over the main surfaces of adjacent lamination sheets. This type of distribution, which ensures a joint between layers that is sufficiently strong for the further processing and subsequent use of the stack and at the same time has no more than a minimal adverse effect on the desired electromagnetic properties of the stack, is advantageous. Laminated cores according to the invention have a large number and fine distribution of joints. As a consequence, external loads in individual joints cause comparatively low stresses since the mechanical stresses are distributed over a plurality of joints and the lever arms between the load application points and the joints are shortened. Such external loads are created by punctiform and linear contact surfaces and relative movements when joining the stacks to shafts and housings, for example.

According to the invention a tying point can be located at any point on the lamination without requiring any change to the design of the system. In this way it is possible to effectively prevent local or complete delamination and the splitting of the laminations in the region of delicate structures (such as teeth), for example. Despite their plurality, the small size of the tying points produces a comparatively small electrical contact surface between the layers, which minimises eddy current losses. The small tying point size also simplifies this method of positioning the tying points, which impairs the magnetic flow as little as possible.

In a fourth embodiment other forms of joints, which can be freely selected by setting the path of the laser dot, are used alongside punctiform joints. The forms may, for example, be straight lines, circles, polygons or other curved lines. Linear seam courses that run parallel to the lines of the magnetic flow are advantageous. The magnetic flow is then only impaired by the width of the seam, so reducing the cross section without imperfections available for the flow. Where a seam runs parallel to the flow, its length has no influence on flow impairment and can be optimised with regard to joint strength and electrical contact surface. This shifts the comprise between electrical contact, magnetic influence and joint strength towards higher joint strengths.

In a fifth embodiment the position of the joints is varied from layer to layer in order to lengthen the eddy current paths created by the electrical contact. Here the laser is set such that as few layers as possible (ideally only two) are joined at each joint. Here the bottom-most layer should not be fused over the entire thickness. This arrangement can be used in the third and fourth embodiments, i.e. with punctiform and elongated joints.

In a series of tests sample ring stacks of VACODUR 49 (VD49) were produced by means of laser spot welding. The stacks produced were subjected to metallographic examination and measurement.

Laser-cut sample rings of VACODUR 49 were fed manually and individually to a clamping device and positioned using a mandrel. Once a sample ring had been fed in, the lid was closed and clamped by screwing to the lower part of the device. The device was positioned in the work chamber of a laser machining centre using stops. The clamped and tensioned layer was laser welded to the already joined sample ring stack below it at a plurality of points on the main surface through the openings in the lid. Following the welding operation, the device was removed, the lid taken off and the next layer or the next sample ring was clamped as described above. The process was repeated until 50 layers of sample rings had been welded to form a ring stack. Four ring stacks were produced in total, varying the laser technology parameters and the form (point and line) and position (always at the same point or alternating from layer to layer) of the joint.

Figure 3:
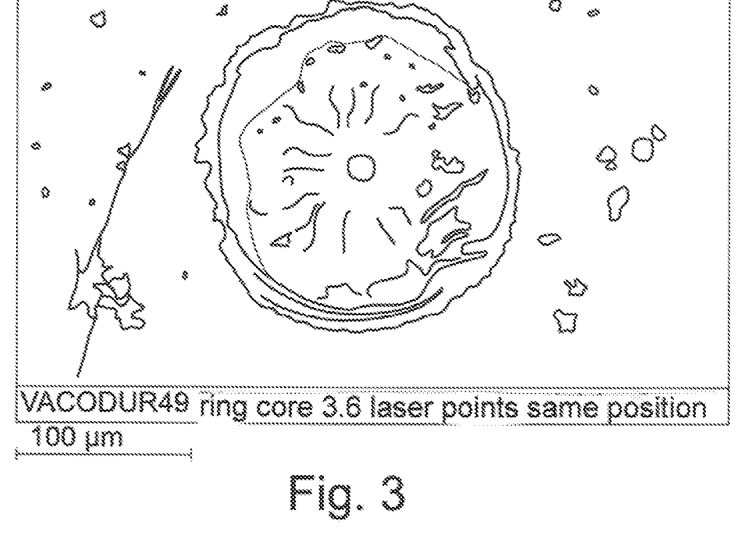
FIG. 3 shows a scanning electronic microscope image of a top view of a punctiform joint.
Figure 4:
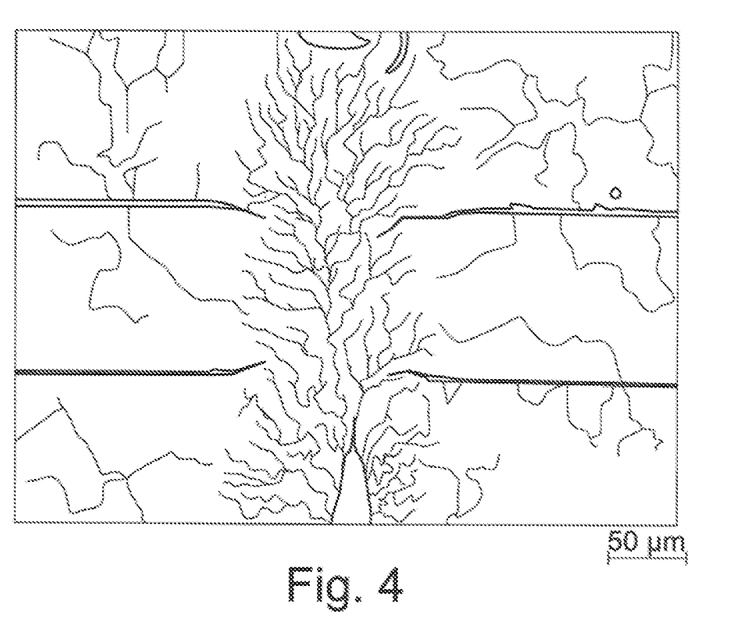
FIG. 4 shows a metallographic section of a cross section of a joint that extends over three lamination sheets.

FIG. 3 shows a scanning electron microscope image of a top view of an example of a punctiform joint and FIG. 4 shows a metallographic section through a punctiform joint in a laminated core. A substance-to-substance joint, in this case comprising three layers, can be seen in cross section. In this embodiment the joints are produced by the repeated welding of two layers at the same point.

Figure 5:
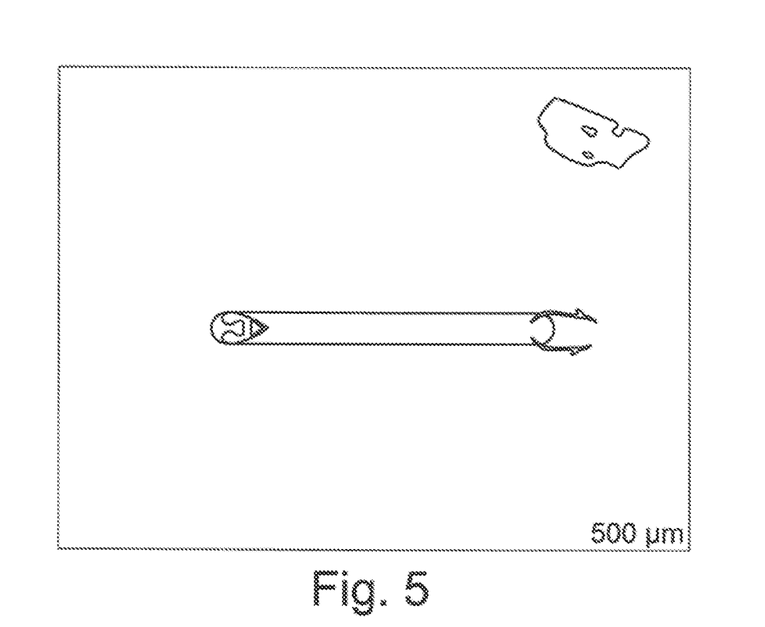
FIG. 5 shows an optical microscope image of a top view of an elongated joint.

FIG. 5 shows an optical microscope image of a top view of an example of a linear joint.

Figure 6:
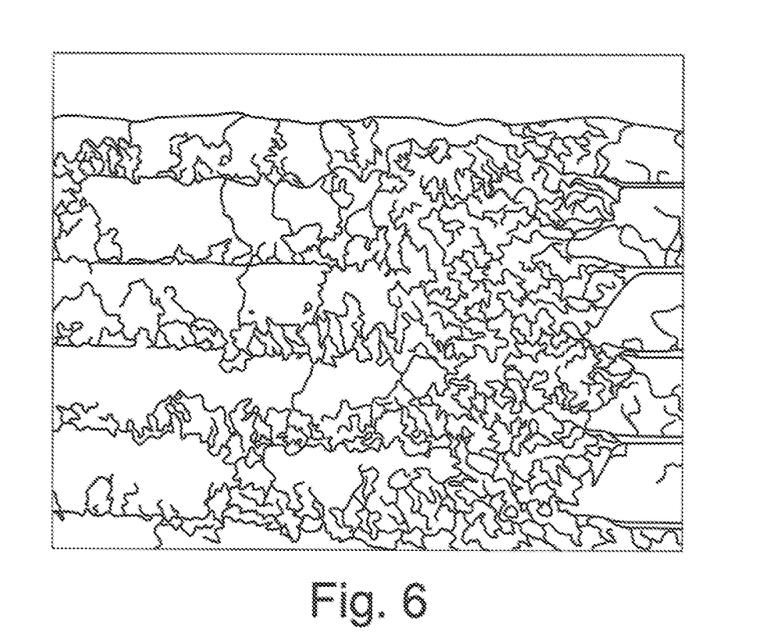
FIG. 6 shows a metallographic cross section of a cross section of an elongated joint.

FIG. 6 shows a metallographic crosssection through a linear joint. The section cut was not parallel to the course of the seam as a result of which the substance-to-substance joint is visible in the right-hand part of the image only (the crosssection extends out of the seam at the left).

Figure 7:
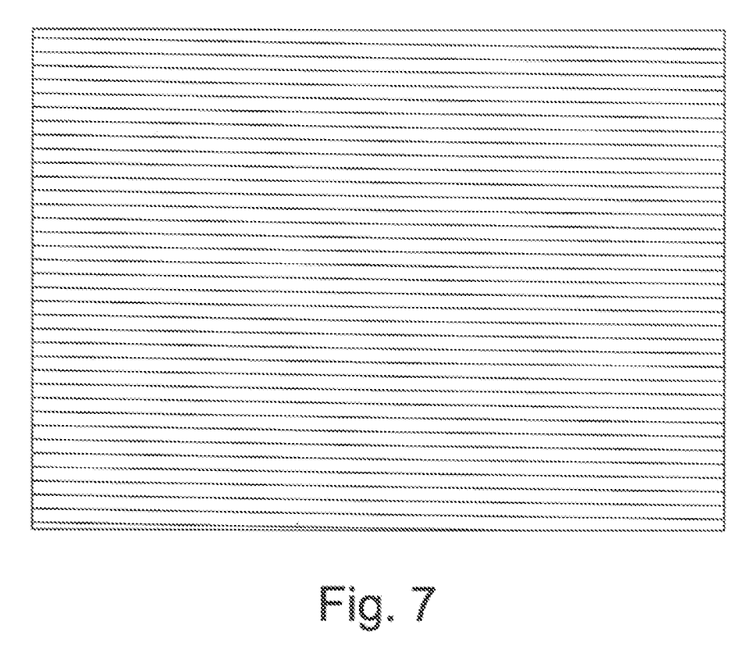
FIG. 7 shows a side view of a laminated core.

FIG. 7 shows a microscope image of a side view of a ring stack produced in the tests in which the stacked lamination sheets can be seen. It also shows a very good fill factor since the distances between the lamination sheets are small.

Figure 8A:
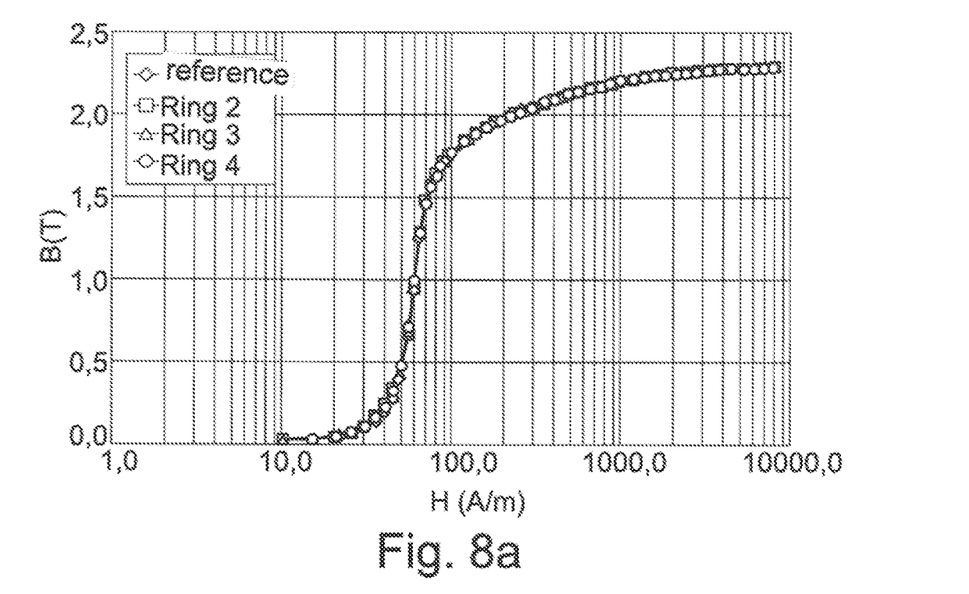
FIG. 8a shows a static measurement of the initial magnetisation curve of a laminated core.
Figure 8B:
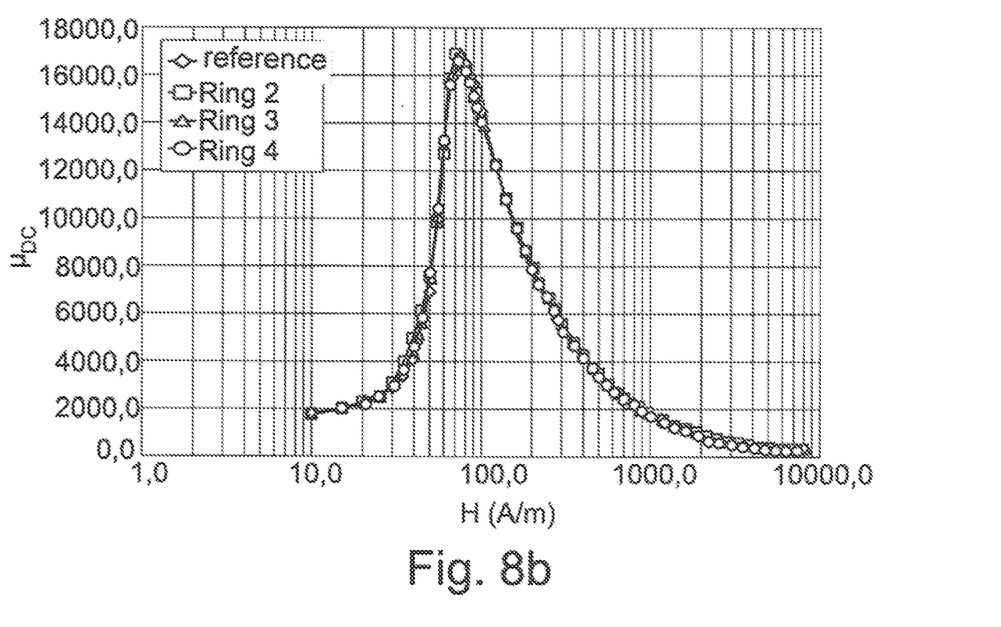
FIG. 8b shows a static measurement of the permeability of a laminated core.

FIGS. 8a and 8b show static measurements of the initial magnetisation curve (FIG. 8a) and the permeability (FIG. 8b) of the ring stacks produced. The ring stacks were subjected to annealing following stacking. Rings 2-4 were laser spot welded with various parameters and compared with a reference stack of loosely stacked rings in the measurement. The lack of any significant difference to the comparison stack indicates that there is no irreversible influence of the stacking process including laser spot welding on the static soft magnetic properties of the material processed.

The invention claimed is:

1. A method for producing a laminated core, comprising:
providing a plurality of lamination sheets made of a soft magnetic alloy and having a main surface and a thickness d;
stacking the main surface of a first lamination sheet on the main surface of a second lamination sheet in a direction of stacking;
substance-to-substance joining of the first and the second lamination sheets by means of a plurality of filler-free joints that are entirely surrounded by the main surfaces of the first and second lamination sheets, and wherein the first lamination sheet is substance-to-substance joined to the second lamination sheet by laser welding or laser spot welding.

2. The method according to claim 1, wherein the laser welding or laser spot welding forms one of the filer-free joints.

3. The method according to claim 1, wherein a laser beam is directed to position the joint on the first lamination sheet.

4. The method according to claim 3, wherein the laser beam is directed at the main surface of the first lamination sheet so as to form a punctiform joint.

5. The method according to claim 3, wherein the laser beam is directed over the main surface of the first lamination sheet so as to form an elongated joint.

6. The method according to claim 5, wherein the elongated joint is arranged parallel to a plane of the lamination core which contains lines of magnetic flow.

7. The method according to claim 1, wherein the first lamination sheet and the second lamination sheet are aligned in relation to one another to form a lap joint or a parallel joint.

8. The method according to claim 1, wherein at least three lamination sheets are stacked one on top of another and joined to one another.

9. The method according to claim 1, further comprising:
stacking at least one further lamination sheet on the second lamination sheet and then
substance-to-substance joining the further lamination sheet and the first lamination sheet by means of a plurality of filler-free joints that are entirely surrounded by the main surface of the further and the first lamination sheets.

* * * * *